(12) United States Patent
Kondo et al.

(10) Patent No.: US 9,521,075 B2
(45) Date of Patent: Dec. 13, 2016

(54) COMMUNICATION DEVICE AND COMMUNICATION CONTROL METHOD

(71) Applicant: FUJITSU LIMITED, Kawasaki-shi, Kanagawa (JP)

(72) Inventors: Taiji Kondo, Chiba (JP); Takao Ito, Kawasaki (JP); Satoshi Ikeda, Tokyo (JP); Hiroaki Kawasumi, Tokyo (JP); Yukio Hayashi, Tokyo (JP); Katsumi Kobayashi, Tokyo (JP); Satoshi Kurosawa, Tokyo (JP); Koichi Ishibashi, Tokyo (JP); Yoshihiko Shirokura, Tokyo (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 14/474,675

(22) Filed: Sep. 2, 2014

(65) Prior Publication Data

US 2014/0369359 A1 Dec. 18, 2014

Related U.S. Application Data

(63) Continuation of application No. PCT/JP2013/055750, filed on Mar. 1, 2013.

(30) Foreign Application Priority Data

Mar. 2, 2012 (JP) .................................. 2012-047361

(51) Int. Cl.
*H04L 12/28* (2006.01)
*H04L 12/721* (2013.01)
*H04W 40/28* (2009.01)
*H04W 84/18* (2009.01)

(52) U.S. Cl.
CPC ............... *H04L 45/70* (2013.01); *H04L 45/26* (2013.01); *H04W 40/28* (2013.01); *H04W 84/18* (2013.01)

(58) Field of Classification Search
CPC combination set(s) only.
See application file for complete search history.

(56) References Cited

FOREIGN PATENT DOCUMENTS

| JP | 2005-033557 | 2/2005 |
| JP | 2010-239248 | 10/2010 |
| JP | 2011-239341 | 11/2011 |

OTHER PUBLICATIONS

Japanese Office Action dated Oct. 6, 2015 in corresponding Japanese Patent Application No. 2014-502423.
(Continued)

*Primary Examiner* — Afshawn Towfighi
(74) *Attorney, Agent, or Firm* — Staas & Halsey LLP

(57) ABSTRACT

A communication device is included in an ad hoc network in a reactive routing scheme. The communication device includes a receiving unit, a selecting unit, and a transfer control unit. The receiving unit receives a route request frame including overall quality information on routes through which the route request frame has passed. The selecting unit selects a route request frame to be transferred to another communication device based on the quality information, from the route request frames received by the receiving unit through a plurality of routes. The transfer control unit transfers the route request frame selected by the selecting unit to the another communication device, and discards the route request frame when a quality value indicated by the quality information of the route request frame is smaller than a predetermined reference value.

3 Claims, 10 Drawing Sheets

(56) References Cited

OTHER PUBLICATIONS

Japanese Office Action dated Dec. 22, 2015 in corresponding Japanese Patent Application No. 2014-502423.
International Search Report mailed May 28, 2013 in corresponding International application PCT/JP2013/055750.
Takeru Hariu, Nobuyoshi Komuro, Shiro Sakata, "Multi-path Routing Control Scheme considering Link-qualities in Mobile Ad Hoc Networks", IEICE Technical Report, Feb. 25, 2010, vol. 109, No. 449, pp. 103 to 108, IN2009-161.
Takeru Hariu, Nobuyoshi Komuro, Shiro Sakata, "Improvement of QoS Routing Control Scheme considering multi-flows in Mobile Ad Hoc Networks", IEICE Technical Report, Mar. 1, 2012, vol. 111, No. 469, pp. 31 to 36, IN2011-142.
Sun et al. "A Study on Overlay Networks on VANETs using Geographic Routing Protocols", IPSJ SIG Technical Report, vol. 2007, No. 90, Sep. 18 2007, Japan, pp. 33-38.
Japanese Office Action dated May 24, 2016 in corresponding Japanese Patent Application No. 2014-502423.

COMMUNICATION DEVICE AND COMMUNICATION CONTROL METHOD

CROSS-REFERENCE TO RELATED APPLICATIONS

This application is a continuation of International Application No. PCT/JP2013/055750, filed on Mar. 1, 2013 which claims the benefit of priority of the prior Japanese Patent Application No. 2012-047361, filed on Mar. 2, 2012, the entire contents of which are incorporated herein by reference.

FIELD

The embodiments discussed herein are directed to a communication device and a communication control method.

BACKGROUND

Related ad hoc networks have been used as a network in which communication nodes wirelessly communicate with each other directly without any access point. Such an ad hoc network has two major routing technologies to establish a route for data transfer between nodes: proactive routing and reactive routing. With the proactive routing technology, each node broadcasts a hello frame to neighboring nodes, thereby periodically collecting the route cost from the nodes on the network to update the route to be used for data transfer to an optimal route. With the reactive routing technology, a node serving as a data source searches an optimal route immediately before routing, thereby establishing the communication route.

In particular, with the reactive routing technology, a node on the network broadcasts a frame called a route request (RREQ) frame to the peripheral node(s) to discover an optimal route. If the RREQ reaches an intended node (e.g., a gateway node), the node creates a route reply (RREP) frame and returns (unicasts) the RREP along the route the RREQ has passed through to the node serving as the source of the RREQ. This establishes a two-way communication route between the above-described node as the source and the intended node. After that, data is transmitted and received by being transferred between the nodes along the established communication route.

FIG. 11 is a diagram for explaining a frame transfer control method in a related ad hoc network 100. As illustrated in FIG. 11, the node 102 receives an RREQ from the source node 101 through two routes. A first route is used by the node 102 to directly receive an RREQ by broadcast from the node 101. A second route is used by the node 102 to receive an RREQ by broadcast from the node 101 through the node 103. This enables the node 102 to receive two identical RREQ frames transmitted through two respective routes, which is likely to cause congestion of the network if both frames are transferred by broadcast to the subsequent node 104. To avoid the congestion, the node 102 broadcasts the firstly received RREQ to the next node 104 and then discards the secondly received RREQ that has passed through the node 103. The order of the frame to reach a node usually depends on the number of nodes the frame passes through (the number of hops); therefore the RREQ that has passed through the node 103 is discarded at the node 102.

Usually, however, a shorter distance between nodes through which the frame passes, increases the quality value of a frame. The frame that passes through the route R101 with a small number of hops and a long distance between the nodes is, therefore, more likely to be lost due to a packet loss, than the frame that passes through the route R102 with a large number of hops and a short distance between the nodes. If the node 102 discards the RREQ frames except for the firstly received RREQ frame, the subsequent high-quality RREQ frames that reach the node 102 later are discarded. As a result, a low-quality RREQ frame is transferred by broadcast to the node 104. As described above, the route to the destination node of the RREQ is established by returning the RREP along the route through which the RREQ is transmitted. This leads to inclusion of a low-quality transfer route in the route for data transmission and reception, thereby disturbing the optimal routing.

The ad hoc network 100 may broadcast both of the two identical RREQ frames transmitted through the two routes at the node 102 for the purpose of improving the communication quality of the route. Specifically, the node 102 maintains the frame ID and the quality information of the received RREQ associated with each other. If the node 102 receives a new RREQ with higher quality than the previously received RREQ, the node 102 also broadcasts the newly received RREQ. Subsequently, the node 104 that is the next node to the node 102 selects the best quality RREQ out of the received RREQs. The node 104 broadcasts the selected RREQ to the peripheral node(s).

Related technologies are described in Japanese Patent No. 4023681, Japanese Laid-open Patent Publication No. 2011-239341, and Japanese Laid-open Patent Publication No. 2010-239248, for example.

With the above-described related frame transfer control method, the node (e.g., the node 102 in FIG. 11) broadcasts an undesirable RREQ that is not used at the peripheral nodes (e.g., the node 104 in FIG. 11). In particular, if a node is on the way of a route, that is, the node is apart from the source node of the RREQ with a predetermined number of hops interposed therebetween, the node receives a plurality of RREQs broadcasted by the nodes through a plurality of routes, respectively. This leads to congestion of the network and the resulting collision of frames.

With the above-described related frame transfer control method, the node receives RREQs that have passed through a plurality of routes. Receiving an impractical RREQ with low quality may advance a timeout of receiving a subsequent RREQ. In other words, the communication with a small number of hops may inhibit the communication with an appropriate number of hops due to the timeout, thereby deteriorating the communication quality of the network. FIG. 12A is a diagram of an example of a frame transfer route in a related ad hoc network 200. As illustrated in FIG. 12A, the number of hops of the RREQ frame transfer route R201 is "2", which is smaller than both the number of hops of the RREQ frame transfer routes R202 "5" and the number of hops of the RREQ frame transfer routes R203 "6". As a result, the RREQ that passes through the frame transfer route R201 reaches the node 203 earlier than other RREQs. This deteriorates the communication quality of the network because the frame transfer route R201 has a longer distance between the nodes.

FIG. 12B is a diagram for explaining a transfer timeout in the related ad hoc network 200. As illustrated in FIG. 12B, in the ad hoc network 200, the RREQ that has passed through the transfer route R201 with a small number of hops reaches the node 203 first, so the time of receiving the RREQ serves as the starting point of the wait time $T_1$ for a new RREQ. When the RREQ that has passed through the transfer routes R202 and R203 with a large number of hops reaches the node 203, the wait time $T_1$ has already elapsed. There is a concern therefore, that the RREQ received through the transfer routes R202 and R203 is not broadcasted due to the timeout. In this example, only the low-quality RREQ is broadcasted at the timing $t_1$ within the above-described wait time $T_1$ at the node 203. This may disable the high-quality RREQ received through the transfer routes R202 and R203 to reach the neighboring node 213, thereby deteriorating the communication quality of the established route.

SUMMARY

According to an aspect of the embodiments, a communication device is included in an ad hoc network in a reactive routing scheme, and includes: a receiving unit that receives a route request frame including overall quality information on routes through which the route request frame has passed; a selecting unit that selects a route request frame to be transferred to another communication device based on the quality information, from the route request frames received by the receiving unit through a plurality of routes; and a transfer control unit that transfers the route request frame selected by the selecting unit to the another communication device, and discards the route request frame when a quality value indicated by the quality information of the route request frame is smaller than a predetermined reference value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. However, the embodiments herein are not intended to limit the scope of the invention.

Figure 1:
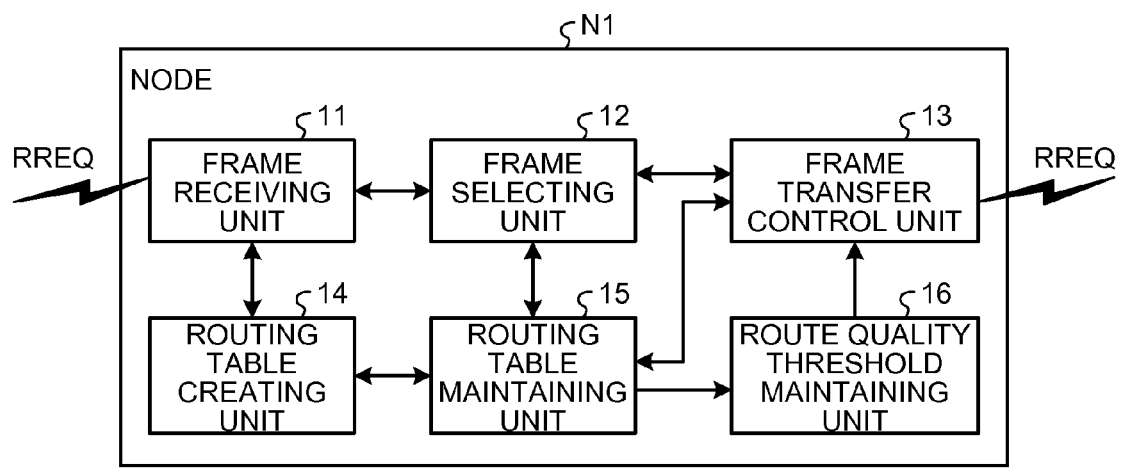
FIG. 1 is a diagram of the functional configuration of a node according to an embodiment.

Firstly described is the configuration of a node according to an embodiment disclosed herein. FIG. 1 is a diagram of the functional configuration of nodes N1 to N23 according to the embodiment. The following describes the configuration of the node N1. The nodes N2 to N23 each have a similar hardware configuration to that of the node N1, the detail descriptions of which are omitted.

The node N1 is, for example, a meter capable of measuring power consumption, reading electricity usage in a smart grid (a next-generation power network), and remotely reporting the results. The node N1 is a communication device included in an ad hoc network in a reactive routing scheme. The node N1 includes, as illustrated in FIG. 1, a frame receiving unit 11, a frame selecting unit 12, a frame transfer control unit 13, a routing table creating unit 14, a routing table maintaining unit 15, and a route quality threshold maintaining unit 16. The components are coupled to each other in a manner that various types of signals and data can be input and output therebetween unidirectionally or bidirectionally.

The frame receiving unit 11 receives an RREQ frame (hereinafter, simply referred to as an "RREQ") having the overall quality information on the routes the RREQ has passed through. The frame selecting unit 12 selects an RREQ to be transferred by broadcast to the neighboring node based on the quality information, from the RREQs received through a plurality of routes. The frame transfer control unit 13 transfers the selected RREQ to the neighboring node. If the quality value indicated by the above-described quality information of the RREQ is smaller than a predetermined route quality threshold, the frame transfer control unit 13 discards the RREQ.

The routing table creating unit 14 creates a routing table for reverse link based on the RREQ received by the frame receiving unit 11. The routing table for reverse link is used for determining the destination of the RREP and timing of transfer. The routing table maintaining unit 15 maintains the created routing table which can be updated. The route quality threshold maintaining unit 16 acquires a predetermined route quality threshold from the received RREQ and maintains the threshold that can be updated. The route quality threshold is a value (a reference value) used for determining whether the node N1 transfers the received RREQ to the neighboring node or discards the received RREQ at the node N1 itself without transferring it.

Figure 2:
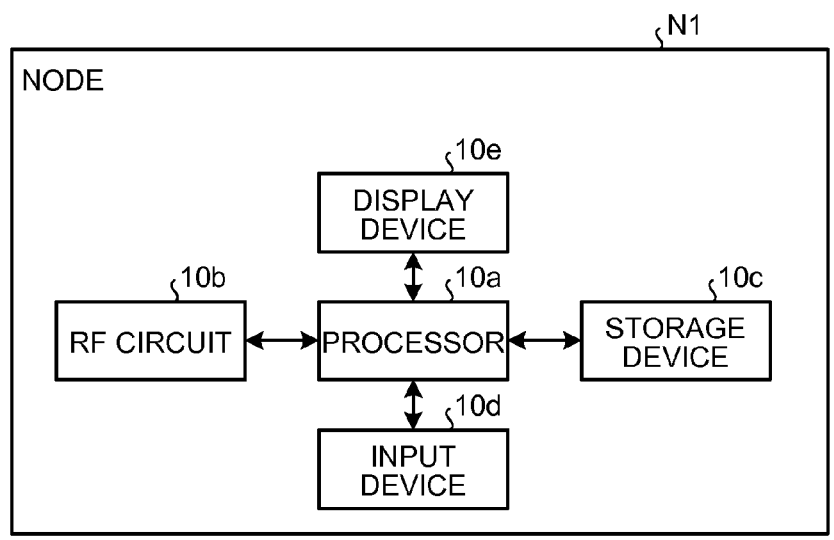
FIG. 2 is a diagram of the hardware configuration of the node according to the embodiment.

The following describes the hardware configuration of a node N1. FIG. 2 is a diagram of the hardware configuration of the nodes N1 to N23 according to the embodiment. The following describes the hardware configuration of the node N1 with reference to FIG. 2. Each of the nodes N2 to N23 has a similar hardware configuration to the node N1, the detailed descriptions of which are omitted.

As illustrated in FIG. 2, in the node N1, a processor 10a, a radio frequency (RF) circuit 10b, a storage device 10c, an input device 10d, and a display device 10e are coupled to each other through a bus in a manner that various types of signals and data can be input and output therebetween. The processor 10a is, for example, a central processing unit (CPU) or a digital signal processor (DSP). The storage device 10c is, for example, a non-volatile storage device such as a hard disk drive (HDD), a read only memory (ROM), and a flash memory. Examples of storage device 10c also include a random access memory (RAM) such as a synchronous dynamic random access memory (SDRAM). The input device 10d includes an operation key and a touch panel, for example. The display device 10e includes a liquid crystal display (LCD) or an electro-luminescence display (ELD), for example.

Out of the functional components of the node N1 illustrated in FIG. 1, the frame receiving unit 11 is implemented by the RF circuit 10b as hardware. The frame selecting unit 12 and the routing table creating unit 14 are both implemented by the processor 10a as hardware. The frame transfer control unit 13 is implemented by the processor 10a and the RF circuit 10b. The routing table maintaining unit 15 and the route quality threshold maintaining unit 16 are both implemented by the storage device 10c as hardware.

Figure 3:
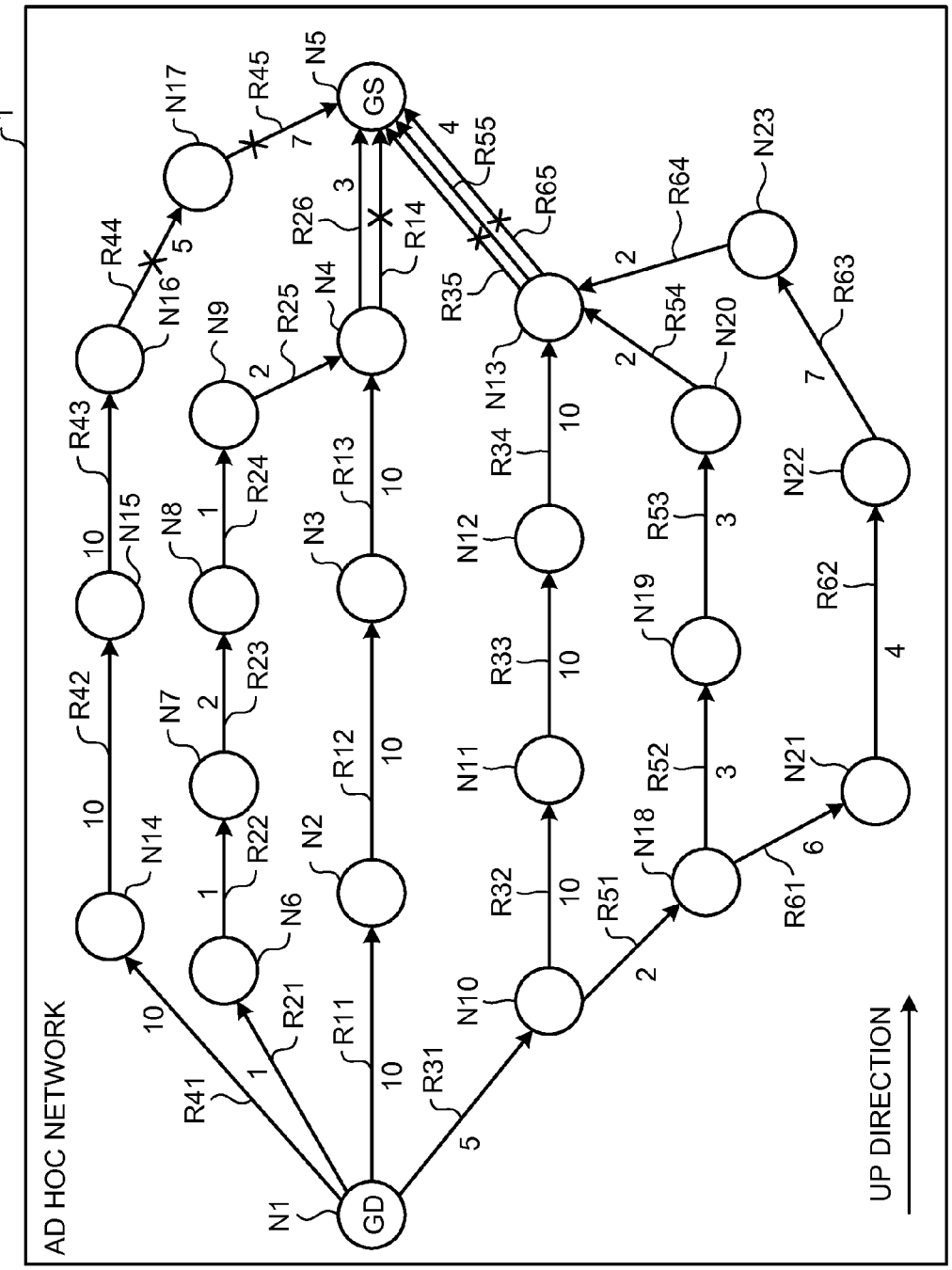
FIG. 3 is a diagram for explaining operations of an ad hoc network according to the embodiment.

The following describes operations of an ad hoc network 1 according to the embodiment. FIG. 3 is a diagram for explaining operations of the ad hoc network 1 according to the embodiment. In the description on the operations, as illustrated in FIG. 3, it is assumed that the RREQ is transferred, whereby the node N1 serves as a global destination (GD) and the node N5 serves as a global source (GS). The ad hoc network 1 includes the nodes N1 to N23 each of which is wirelessly coupled to its neighboring nodes. In the ad hoc network 1, each of the nodes N1 to N23 refers to the route quality for appropriately limiting transfer of the RREQ, thereby preventing unnecessary identical frames from being dispersed, increased, or accumulated in the network. This enables the ad hoc network 1 to establish a high-quality optimal route while suppressing congestion of the network.

In FIG. 3, although each of the nodes N1 to N23 has a similar configuration to that of the node 10 illustrated in FIGS. 1 and 2, different reference numerals are used than that of the node 10 for convenience of description. The arrows connecting the nodes N1 to N23 each represent the transfer direction of an RREQ. The numerical values above or below the arrows (e.g., "10" below the route R11) each represent the route quality of the corresponding interval. The smaller numerical value represents lower route cost of the interval and thus better route quality. In FIG. 3, although only the arrows in the up direction are illustrated for convenience of description, the frame can be transmitted in the reverse direction (the down direction).

The node N1 that is the source of the RREQ sets the above-described route quality threshold in the RREQ and transmits the RREQ by broadcast. The neighboring node (e.g., the node N2) that receives the RREQ transmitted from the node N1 adds the route information "10" of the route R11 through which the RREQ has passed to the route quality weighted value. The neighboring node registers the resultant value in the routing table for reverse link. The nodes N2 to N23 repeat the above-described operations when each node receives the RREQ. If the route quality weighted value at the time of receiving the RREQ or adding the route information exceeds the above-described route quality threshold (e.g., "25") at any one of the nodes, the corresponding node discards the RREQ. This decreases the number of potential routes used for routing, thereby reducing the network traffic. This enables the ad hoc network 1 to select a route to be used out of good-quality routes while suppressing the congestion of the network.

The following describes a transfer control method of the RREQ on which a route quality threshold of "25" has been set with reference to FIG. 3. While the RREQ from the node N1 as its source is passing through the nodes N2 and N3, the route quality weighted value is updated to "30", which exceeds the route quality threshold before reaching the node N5 as the destination. The RREQ is not transferred, therefore, from the node N4 to the node N5 on the way of the route, and is thus discarded at the node N4 as illustrated with the mark x along the route R14. In contrast, the RREQ that reaches the node N4 passing through the nodes N6 to N9 has its route quality weighted value of "7 (=1+1+2+1+2)", which is still smaller than "25". The RREQ that reaches the node N4 along the route R25 is transferred, therefore, from the node N4 to the node N5 without being discarded at the node N4.

The RREQ that passes from the node N1 through the nodes N10 to N13 is not transferred to the node N5 because its route quality weighted value "35" exceeds the route quality threshold "25" at the node N13. The RREQ that passes from the node N1 through the nodes N10 to N13 is then discarded at the node N13 as illustrated with the mark x along the route R35. In the same manner, the RREQ that passes from the node N1 through the nodes N10, N18, and N21 to N23 is not transferred to the node N5 because its route quality weighted value reaches "26" at the node N13, which exceeds the route quality threshold, and is thus discarded at the node N13 as illustrated with the mark x along the route R65. In contrast, the RREQ that reaches the node N13 passing through the nodes N10 and N18 to N20 has its route quality weighted value of "15 (=5+2+3+3+2)". As a result, only the RREQ that passes through the route R54 is transferred by broadcast from the node N13 to the destination node N5. This suppresses congestion caused by dispersed frames compared with the case in which all of the above-described three RREQs are transferred, and transfers only the RREQ having the highest route quality from among the three RREQs. Thus, good route quality is maintained.

The route quality weighted value of the RREQ that passes through the nodes N14 to N17 exceeds the route quality threshold "25" at the node N16. As a result, the RREQ that passes along the route R43 is discarded at the node N16 without reaching the next node N17 or the node after the next N5 as illustrated with the marks x along the routes R44 and R45. This prevents an impractical RREQ, unlikely to be used even if it reaches the destination node N5, from being transferred in advance. This suppresses congestion of a network caused by dispersed frames.

As illustrated in FIG. 3, two RREQs reach the node N5 through the two routes, that is, the routes R26 and R55. The node N5 selects the RREQ that has passed through a route with the lower route cost out of the two RREQs. The route quality weighted value of the RREQ that has passed through the route R26 is "10" and the route quality weighted value of the RREQ that has passed through the route R55 is "19". The node N5 therefore estimates the RREQ that has passed through the route R26 as an RREQ with higher route quality and then selects the route the corresponding RREQ has passed through to be a return route for an RREP. The node N5 transmits the RREP to the node N1 through the nodes N4, N9, N8, N7, and N6 (the reverse route from the route of the above-described RREQ). This establishes a high-quality data transfer route between the nodes N1 and N5. The node N5 only has to select an intended RREQ out of the focused RREQs selected by the above-described node. This spends a smaller process time for routing than the case an intended RREQ is selected out of all of the broadcasted RREQs, thereby reducing the process load for routing.

With reference to FIG. 3, it is noted that out of the nodes positioned at both ends of the network (GD and GS), the node N1 may receive an RREQ broadcasted by another node, and the node N5 may broadcast an RREQ to still another node although this example is not illustrated.

The following describes operations of the ad hoc network 1 in greater detail with reference to FIGS. 4 to 9. In the description of the operations, hereinafter, a table created by the nodes included in the ad hoc network 1 while each receiving the RREQ is referred to as a "routing table for reverse link". In contrast, a table created by the nodes included in the ad hoc network 1 while each receiving the RREP for the above-described RREQ (hereinafter, simply referred to as an "RREP") is referred to as a "routing table for forward link". The routing table for reverse link is also referred to by the nodes when transferring the RREP.

Figure 4:
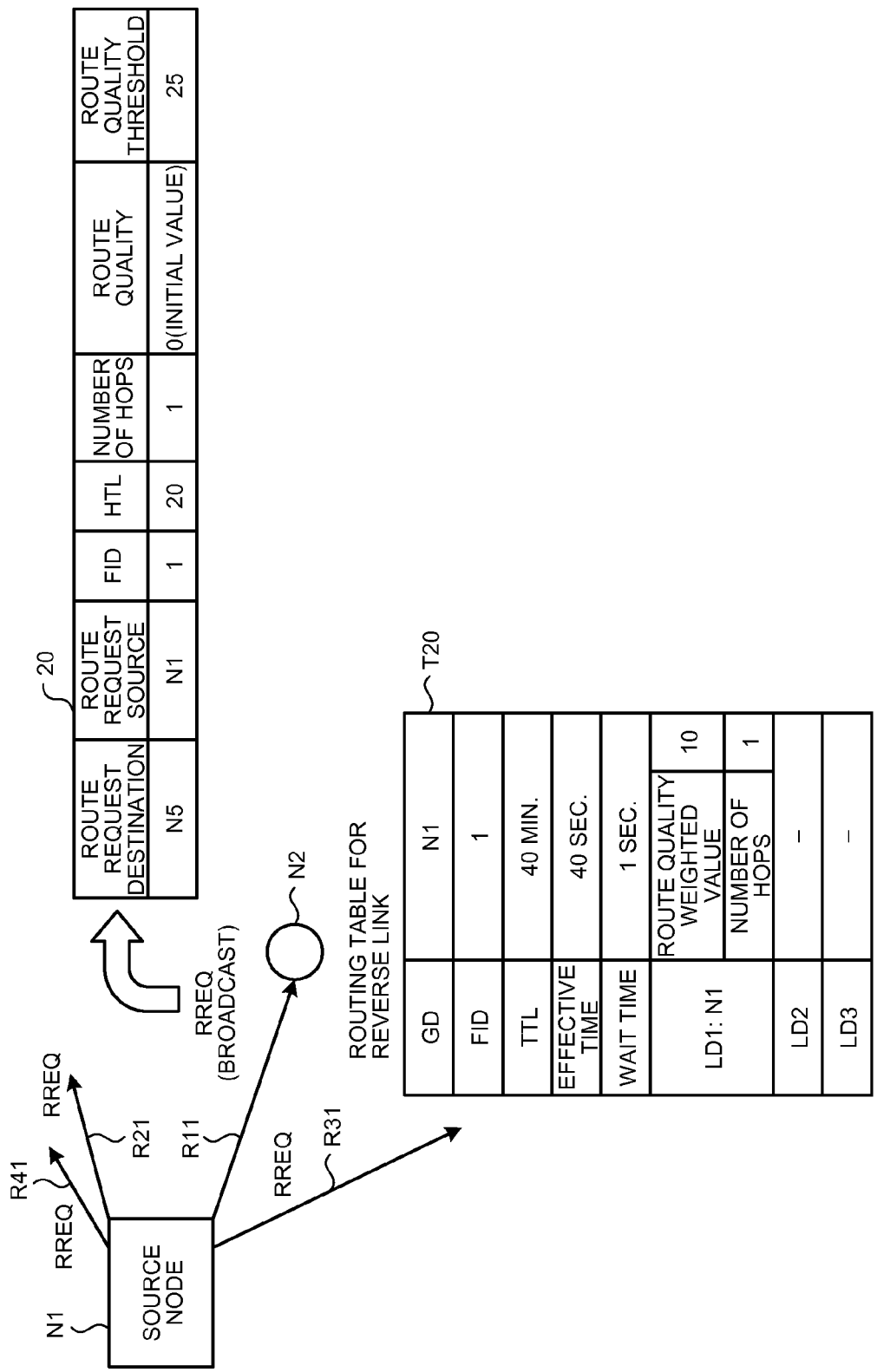
FIG. 4 is a diagram for explaining a routing operation of transmitting a broadcast route request (RREQ) frame by a node N1 according to the embodiment.

FIG. 4 is a diagram for explaining a routing operation of transmitting a broadcast RREQ by the node N1. If the source node N1 transmits data to the node N5, the source node N1 transmits an RREQ by broadcast at the time when absence of registration of the destination node N5 is confirmed in both of the above-described routing tables, that is, the routing table for reverse link and the routing table for forward link. If the neighboring node N2 receives the RREQ from the node N1, the neighboring node N2 registers the detail information of the RREQ in the routing table for reverse link. In the present embodiment, an RREQ 20 with the configuration illustrated in FIG. 4 is broadcasted. The RREQ 20 includes "N5" as a route request destination node, "N1" as a route request source node, and "1" as the frame ID of the RREQ 20 itself. In the RREQ 20, two operations parameters are set: "20" as the upper limit value (HTL) for limiting the number of hops the RREQ passes through in routing; and "25" as the route quality threshold serving as a value (a reference value) used for determining whether the RREQ is to be discarded. The RREQ 20 includes a numerical value "1" representing the present number of hops, and a numerical value "0" representing the initial value of the above-described route quality.

The node N2 creates a routing table for reverse link T20 based on the RREQ 20. As illustrated in FIG. 4, in the routing table for reverse link T20, the following is stored: "N1" as a source node (GD) of a route request (a path search request); "1" described above as the frame ID; and "40 min." as an aging time (time to live, TTL) of the routing table for reverse link T20. In addition, "40 sec." as an effective time for a table for routing and "1 sec." as a wait time for receiving the RREQ are also stored in the routing table for reverse link T20. Furthermore, "10" as a route quality weighted value d on the route R11 between the nodes N1 and N2 and "1" described above as the number of hops are stored in the routing table for reverse link T20. The route quality weighted value d can be acquired with reference to a link table (not illustrated) included in the node N2. If the node N1 is not registered in the link table, the node N2 may use an equivalent value calculated from the received radio wave intensity of the RREQ as the route quality weighted value d.

Figure 5:
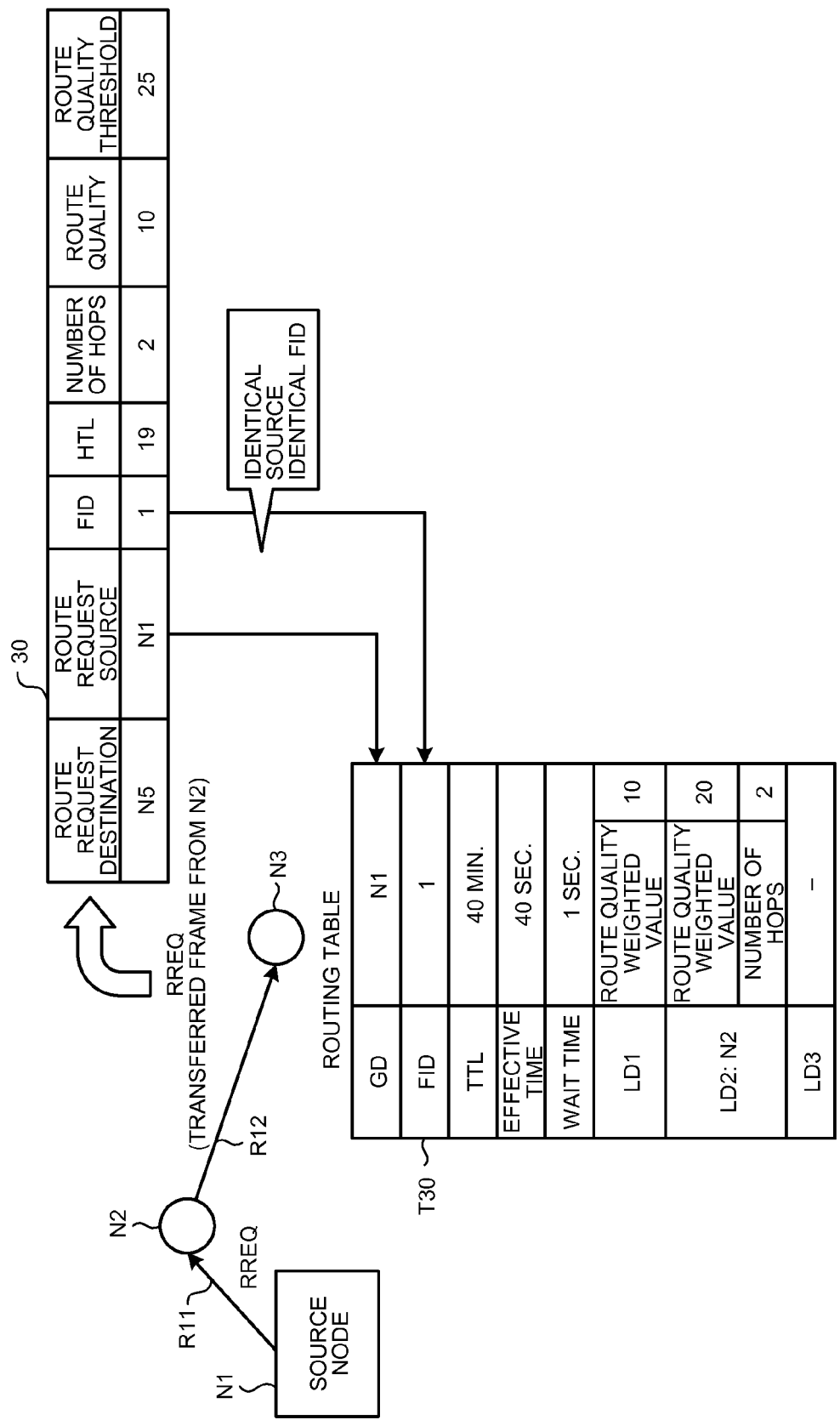
FIG. 5 is a diagram for explaining a routing operation of transmitting a broadcast RREQ by a node N2 according to the embodiment.

FIG. 5 is a diagram for explaining a routing operation of transmitting a broadcast RREQ by the node N2. An RREQ 30 and a routing table for reverse link T30 illustrated in FIG. 5 have a similar configuration to that of the above-described RREQ 20 and the routing table for reverse link T20. The detailed description thereof is therefore omitted. The HTL value of the RREQ 30 decreases by one and is thus updated to "19" as the RREQ hops over the route R11. The route quality value is updated from the initial value "0" to the route quality weighted value of the route R11 "10". In the routing table for reverse link T30 having the same source node and the same frame ID (FID) as the routing table for reverse link T20, the accumulated value of the route quality "20 (=10+10)", which is the route quality weighted value d of the routes R11 and R12 between the nodes N1 to N3, is stored along with the number of hops "2". If the node N2 is not registered in the link table, the node N3 uses an equivalent value calculated from the received radio wave intensity of the RREQ as the quality value of the route R12 for calculating the route quality weighted value d.

As described above, because the present route quality weighted value d is "20" and the route request threshold set in the RREQ 30 is "25", the route quality weighted value d is still smaller than the threshold. The node N3 therefore continues broadcasting the RREQ to the peripheral node(s) without discarding the RREQ that has passed through the routes R11 and R12 at the node N3 itself.

Figure 6:
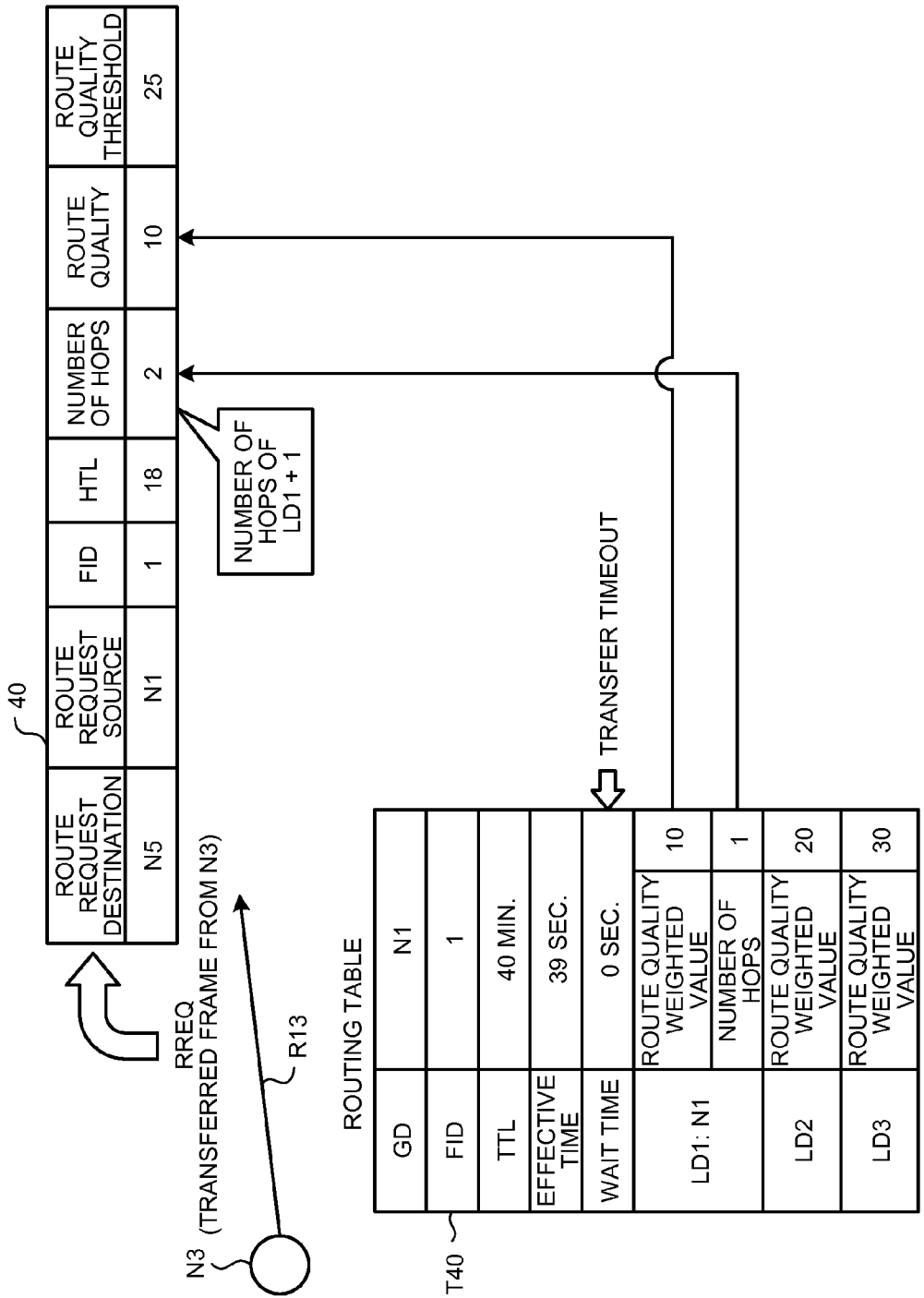
FIG. 6 is a diagram for explaining a routing operation of transmitting the broadcast RREQ after a wait time by the node N2 according to the embodiment.

FIG. 6 is a diagram for explaining a routing operation of transmitting an RREQ by broadcast after a wait time by the node N2. An RREQ 40 and a routing table for reverse link T40 illustrated in FIG. 6 have the similar configuration to the above-described RREQ 20 and the routing table for reverse link T20. The detailed description thereof is therefore omitted. The node N3 transmits the RREQ 40 to the peripheral node(s) by broadcast at the end of the wait time (e.g., 1 sec.) for receiving the above-described RREQ. The number of hops of the RREQ 40 to be transferred is updated to the value acquired by adding "1" to the number of hops "1" of the route R11 stored in the routing table for reverse link T40. This also updates the HTL value to "18 (=20−2)". In addition, the route quality value of the RREQ 40 is updated to "10", which is the route quality weighted value d of the route R11.

Figure 7:
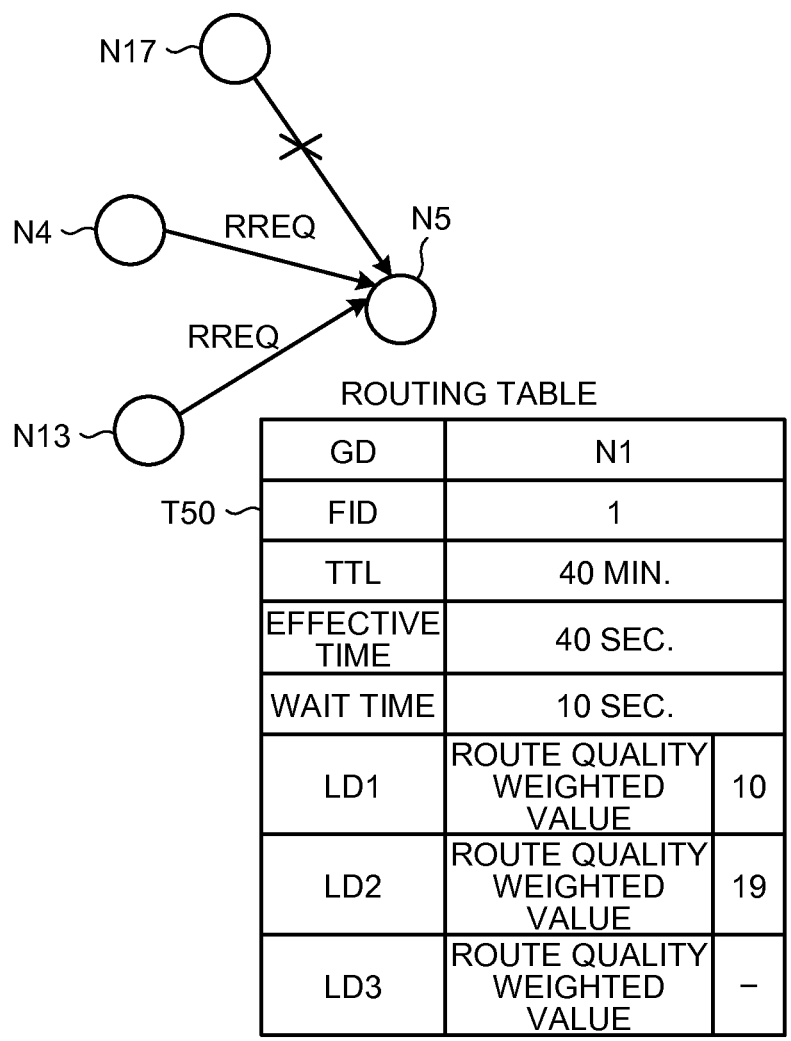
FIG. 7 is a diagram for explaining a routing operation of receiving a broadcast RREQ by a node N5 according to the embodiment.

If the broadcasted RREQ passes through a plurality of routes and reaches the node N5, in the same manner as other transfer nodes, a routing table for reverse link T50 is created in the node N5. FIG. 7 is a diagram for explaining a routing operation of receiving a broadcast RREQ by the node N5. As illustrated in FIG. 7, in the field of the wait time for receiving the RREQ in the routing table T50, a value representing a wait time for collecting the RREQs is stored as an operation parameter. The routing table T50 is sorted in ascending order of the route quality weighted value d. The node N5 is a node to execute routing between the node N5 itself and the node N1, which is different from other transfer nodes (e.g., the nodes N2 and N9). From a viewpoint of increasing the route quality, in the node N5, the wait time is preferably set longer than other transfer nodes to complete receiving the RREQ (with a long route length) which reaches the node later (with a long route length). The wait time for collecting the RREQs is preferably about 5 to 20 seconds, and more specifically 10 seconds, for example.

Figure 8:
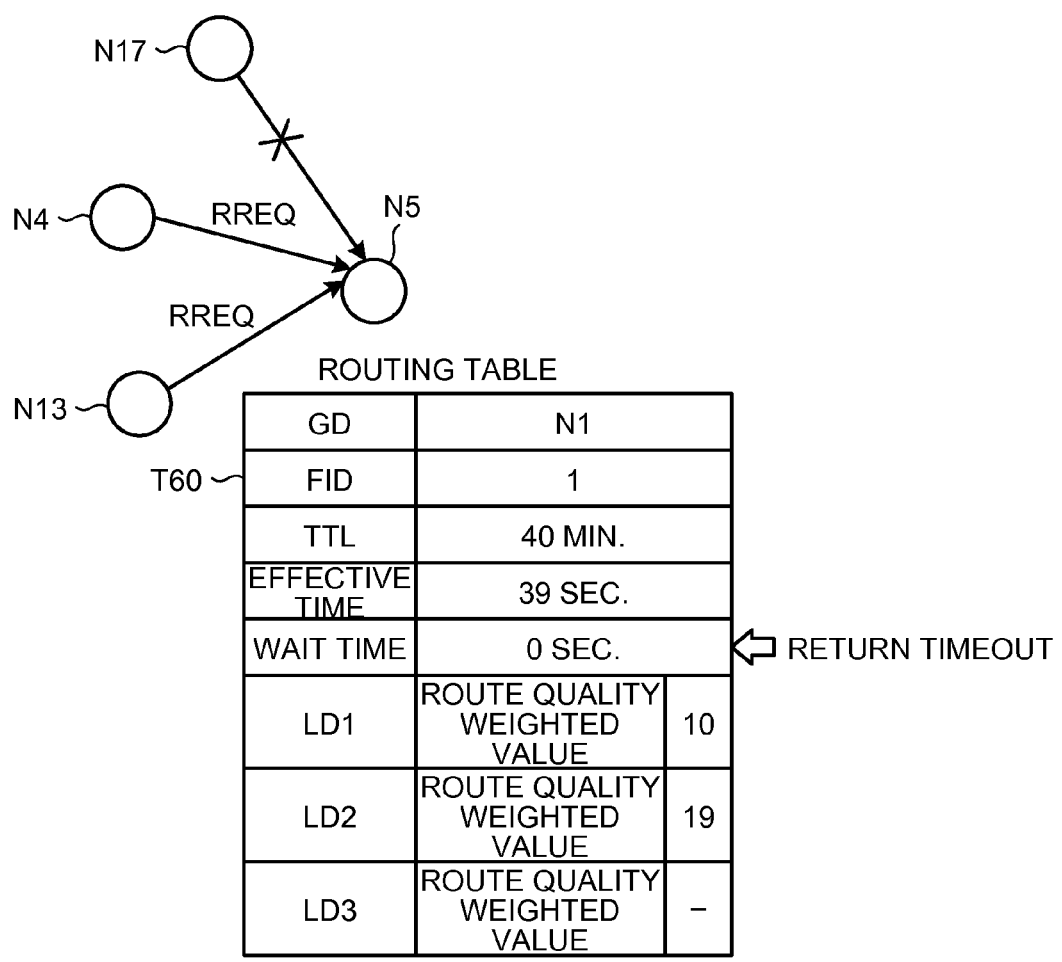
FIG. 8 is a diagram for explaining a routing operation before transmitting a unicast route reply (RREP) by the node N5 according to the embodiment.

FIG. 8 is a diagram for explaining a routing operation before transmitting a unicast RREP by the node N5.

If the source of the RREQ is not a gateway (GW) node, the node N5 returns the RREP to the source node N1 at the timeout of the wait time for receiving the RREQ. The RREP is returned by unicast referring to the routing table for reverse link T60.

Figure 9:
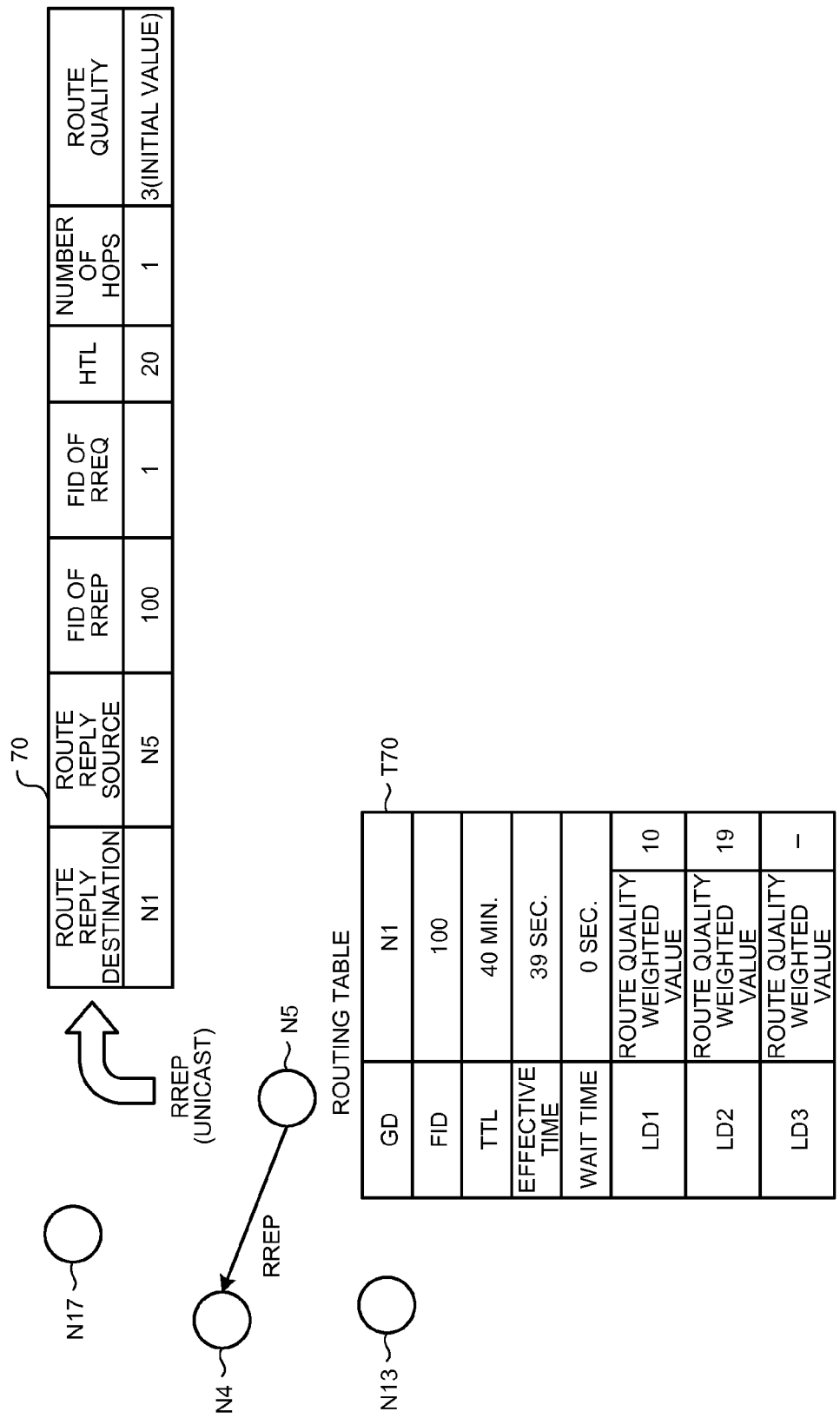
FIG. 9 is a diagram for explaining a routing operation of transmitting a unicast RREP by the node N5 according to the embodiment.

FIG. 9 is a diagram for explaining a routing operation of transmitting a unicast RREP by the node N5. An RREP 70 includes "N1" that is the source node ID of the RREQ as the destination node of the route reply and "N5" that is the destination node ID of the RREQ as the source node of the route reply. The RREP 70 includes "100" as the frame ID of itself and "1" as its corresponding ID of the RREQ. In the RREP 70, an operation parameter "20" is set, which is the upper limit value (HTL) for limiting the number of hops the RREP passes through in routing. The RREP 70 includes numerical values "1" representing the present number of hops and "3" representing the initial value of the route quality. The initial value of the route quality is a weighted value of a link on the returning route in the link table.

The node N5 creates the routing table for reverse link T70 based on the RREP 70. As illustrated in FIG. 9, in the routing table for reverse link T70, the following parameters are stored: "N1" as the source node of the route request (GD); the above-described "100" as the frame ID; and "40 min." as the aging time (TTL) of the routing table T70. In addition, the parameters "39 sec." as an effective time for a table for routing and "0 sec." (a timeout) as a wait time for receiving the RREQ are also stored in the routing table T70. Furthermore, the following parameters are stored: "10" as the route quality weighted value d if the node N5 transmits the RREP 70 to an Local Destination (LD)1 (the node N4); "19" as the route quality weighted value d if the node N5 transmits the RREP 70 to an LD2 (the node N13); and "-" as the route quality weighted value d if the node N5 transmits the RREP 70 to an LD3 (the node N17).

The parameter "-" represents that the RREQ does not reach the node N5 because the route quality weighted value d reaches the route quality threshold "25" before the RREQ reaches the node N5. In this example, the LD3 has no route quality weighted value d, the LD3 is therefore not selected as the return route of the RREP. If the LD2 and LD3 are not registered in the link table, the node N5 may use an equivalent value calculated from the received radio wave intensity registered in advance in the routing table for reverse link T70 as the route quality weighted value d.

In the present embodiment, as illustrated in FIG. 9, out of the LD1, LD2, and LD3 that is each a potential destination of the RREP, the route quality weighted value d of the LD1 has the minimum value "10", which is estimated to have the lowest route cost. The node N5 thus selects the node N4 (refer to FIG. 3) corresponding to the LD1 as the immediate destination of the RREP. From the time the RREP is firstly transmitted, the nodes N4, N9, N8, N7, and N6 each sequentially transfer the RREP by selecting an LD with the minimum route quality weighted value d referring to the routing table of the node itself. This establishes the highest-quality data transfer route between the nodes N5 and N1.

As described above, the RREQ is controlled by the FID that is an identifier of the frame. A plurality of RREQs each having an identical FID pass through a plurality of routes and reach a particular node out of the nodes N1 to N23. For that reason, a predetermined wait time is set on each of the nodes N1 to N23 before the RREQ is transferred by broadcast to the peripheral node(s). If a particular node receives an RREQ from another node during the wait time, the route quality weighted value d is updated.

As described above, the node 10 is a communication device included in the ad hoc network 1 with a reactive routing function. The node 10 includes the frame receiving unit 11, the frame selecting unit 12, and the frame transfer control unit 13. The frame receiving unit 11 receives a route request frame (RREQ) having the overall quality information (e.g., the route quality weighted value) on the routes the RREQ has passed through. The frame selecting unit 12 selects an RREQ frame to be transferred by broadcast to other communication devices (e.g., a neighboring node or a peripheral node) based on the above-described quality information, from the RREQs received from the frame receiving unit 11 through a plurality of routes. The frame transfer control unit 13 transfers the RREQ selected by the frame selecting unit 12 frame to the above-described other communication devices. If the quality value indicated by the above-described quality information of the RREQ frame is smaller than a predetermined reference value (e.g., a route quality threshold), the frame transfer control unit 13 discards the RREQ frame.

The frame selecting unit 12 may select the RRQ frame with the best quality represented by the above-described quality information out of the received route request frames. The above-described quality information is information on the number of hops of the above-described route request frame counted from the source, or the information related to the quality of a plurality of links included in the above-described routes. The above-described quality information is, for example, information related to the utilization of the wireless line of the above-described ad hoc network. This information can be acquired by converting the number of hops of the above-described route request frame counted from the source into the utilization of the wireless line. According to an aspect of the embodiment, the frame selecting unit 12 selects the frame that has passed through the route with the lowest utilization of the wireless line, in other words, the frame that has passed through the route with sufficient resources.

The information used for determining the above-described route quality is not limited to the above-described utilization of the wireless line. Other examples of the information include a received signal strength indication (RSSI), an evaluation coefficient (reciprocal of the route quality value), and a metric. In addition, examples of the quality information may be the information related to the status of a link such as a frame error rate (FER) and a signal-to-interference and noise power ratio (SINR).

As described above, in the ad hoc network 1 with a reactive routing function, the nodes N1 to N23 each transfer the route request frame selected based on the overall quality information on the routes the frame has passed through before it reaches a particular node out of the nodes N1 to N23 to the neighboring node. This enables the nodes N1 to N23 to establish an optimal route while suppressing congestion of the network caused by dispersion of unnecessary identical frames in the network.

Figure 10:
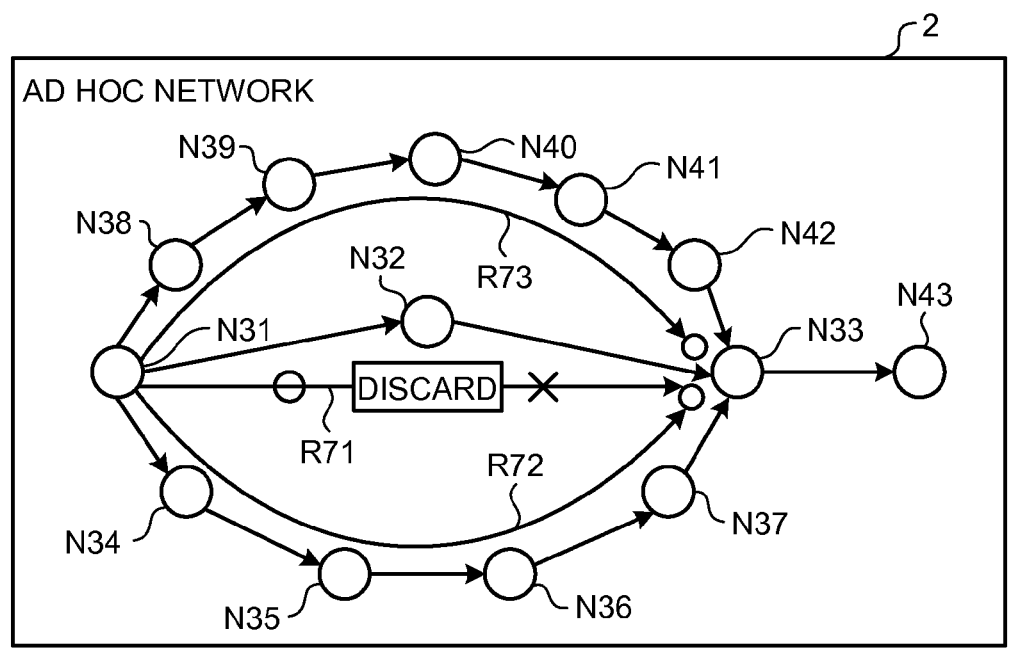
FIG. 10 is a diagram for explaining effects of a frame transfer control method according to the embodiment.
Figure 11:
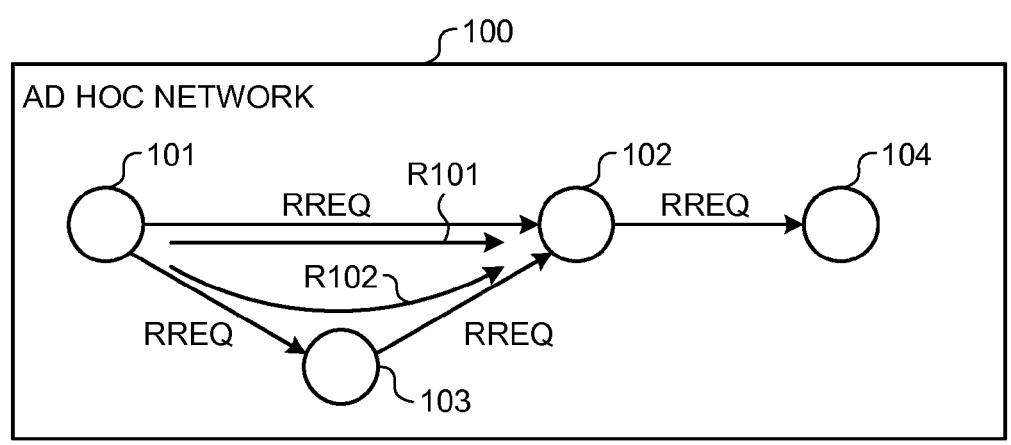
FIG. 11 is a diagram for explaining a frame transfer control method in a related ad hoc network.
Figure 12A:
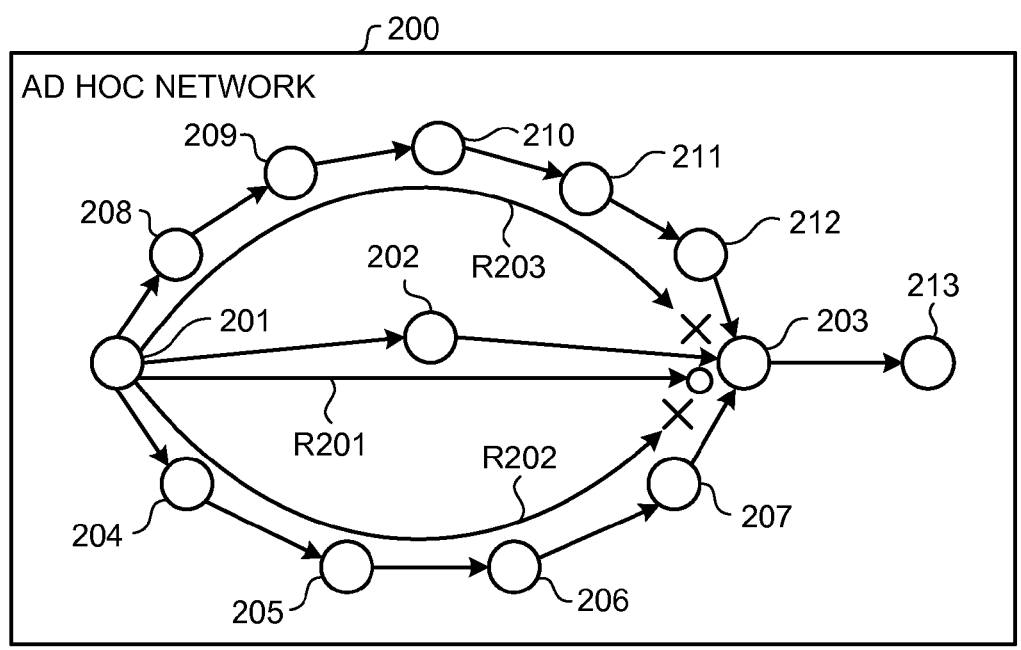
FIG. 12A is a diagram of an example of a frame transfer route in the related ad hoc network.
Figure 12B:
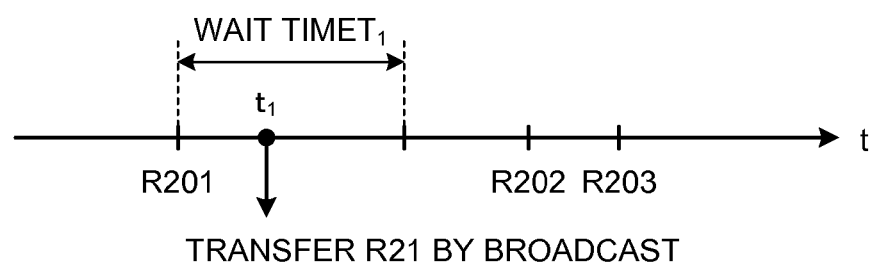
FIG. 12B is a diagram for explaining a transfer timeout in the related ad hoc network.

The following describes other effects of a frame transfer control method according to the embodiment with reference to FIG. 10 and above-described FIG. 12A. Referring to FIG. 12A again, in the related frame transfer control method, the RREQ transferred from the node 202 to the node 203 reaches the node 203 earlier than other RREQs in spite of its low route quality, which is discarded and not used. At the node 203, the time of receiving the RREQ passed through the route R201 is the start time (the starting point) of the above-described wait time. The RREQ transferred from the node 202 to the node 203 therefore advances the starting point of the wait time, thereby advancing the timeout. This excludes other RREQs passed through the routes R202 and R203, which are desirably used to increase the route quality, due to the timeout and actually not used for the routing.

FIG. 10 is a diagram for explaining effects of the frame transfer control method according to the embodiment. As illustrated in FIG. 10, in an ad hoc network 2 according to the present embodiment, the RREQ with low route quality is discarded at the node (e.g., the node N32 in FIG. 10) before the node where RREQs converge (e.g., the node N33 in FIG. 10). As a result, the RREQ that has passed through the route R71 (corresponding to the route R201 in FIG. 12A) does not reach the node N33 (corresponding to the node 203 in FIG. 12A). The timing of receiving the RREQ that has passed through the route R71 does not understandably exist and thus never triggers the above-described wait time. This achieves a later timeout than with the related frame transfer control method. Therefore, the RREQs that have passed through other high-quality routes R72 and R73 (corresponding to the routes R202 and R203 in FIG. 12A, respectively) reach the node N33 without being excluded due to the timeout. This ensures that the RREQs that have passed through other high-quality routes R72 and R73 with higher quality can be used at the node N33 without being lost among the RREQs with low route quality. Discarding undesirable RREQs suppresses the congestion of the network and achieves routing of high communication quality.

In the above-described embodiment, a value of "25" is set as the route quality threshold in the RREQ. This is provided merely for exemplary purpose and is not limited hereto. The route quality threshold may be changed to an appropriate value within the scope of the above-described embodiment. The upper limit value of the route quality threshold is preferably set to such a small value that congestion can effectively be suppressed (e.g., approximately "30") and the lower limit value of the threshold is preferably set to such a large value that predetermined route quality can be ensured (e.g., approximately "10").

As for the time of discarding RREQs, from a viewpoint of reducing leaks of transferring RREQs, the nodes N1 to N23 may each discard other undesirable RREQs after completion of transfer of an RREQ with high route quality. For example, the node N13 in FIG. 3 receives three RREQs from three directions. After the node N13 selects the RREQ that has passed through the best-quality route R54, the node N13 maintains the RREQs that have passed through other routes R64 and R34 until the transfer of the RREQ that has passed through the best-quality route R54 completes. If the transfer failed by a certain factor, the node N13 may transfer the RREQ that has passed through a good-quality route R64 to the node N5. If the transfer fails again, the node N13 may transfer the RREQ that has passed through a good-quality route R34 to the node N5. This increases the certainty of the RREQ to reach the destination node N5, thereby improving the reliability of the network.

In the above-described embodiment, a single RREQ has a route quality value equal to or larger than the route quality threshold at the transfer nodes (refer to FIG. 3). If a plurality of RREQs exist each of which has a route quality value equal to or larger than the route quality threshold, the nodes may transfer the RREQs by broadcast. Each of the nodes may filter the RREQs having a route quality value equal to or larger than the route quality threshold based on the quality information such as the route quality weighted value d. For example, if a plurality of RREQs reach a particular node within the wait time, the node may transfer only the RREQ with the best route quality out of the maintained RREQs after discarding the RREQs with a route quality value smaller than the route quality threshold. This prevents an RREQ unlikely to be used for routing from being transferred, thereby further suppressing the congestion of the network.

In contrast, if no RREQ exists that has a route quality value equal to or larger than the route quality threshold, the nodes may cancel the transfer of the RREQ by broadcast. If no RREQ exists that has a route quality value to a predetermined level, the nodes may transfer the RREQ with the best route quality out of the received RREQ. This prevents non-delivery of the RREQ to be used for routing. The destination node of the RREQ therefore achieves routing while suppressing congestion of the network caused by dispersion of frames in the network. This also improves the reliability of the network.

Each of the elements of the node 10 does not necessarily need to be configured physically in the manner illustrated in the drawings. In other words, specific configurations in which each of the devices is divided or integrated are not limited to those illustrated in the drawings, and the whole or a part of the devices may be divided or integrated functionally or physically in any unit depending on various loads or utilization. For example, the frame receiving unit 11 and the routing table creating unit 14 may be integrated as a single component. Alternatively, the routing table maintaining unit 15 and the route quality threshold maintaining unit 16 may be integrated as a single component. In contrast, for example, the frame transfer control unit 13 of the node 10 may be divided into a portion to transfer the selected RREQ to the neighboring node and a portion to discard the RREQ if the RREQs with a route quality value represented by the above-described quality information is smaller than the predetermined reference value. In addition, the storage device 10c may be coupled to the node 10 as an external device through a network or a cable.

According to an aspect of a communication device disclosed in the present application, a high-quality communication route can be established while the congestion of the network caused by dispersed frames is being suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device included in an ad hoc network in a reactive routing scheme, the communication device comprising:
a processor that executes a process including:
receiving a route request frame including overall quality information on routes through which the route request frame has passed;
selecting a route request frame to be transferred to another communication device based on the quality information, from the route request frames received at the receiving through a plurality of routes; and
transferring the route request frame selected at the selecting to the another communication device, and discarding the route request frame when a quality value indicated by the quality information of the route request frame is smaller than a predetermined reference value, wherein
the predetermined reference value is a value used for determining whether the communication device newly transfers the received route request frame to a neighboring communication device or discards the received route request frame at the communication device itself without transferring the received route request frame,
the selecting includes selecting the route request frame to be transferred by broadcast to the neighboring communication device and a peripheral communication device, based on the quality information, and the transferring includes setting the predetermined reference value in the route request frame and transmitting the route request frame by broadcast.

2. The communication device according to claim 1, wherein the quality information is information related to number of hops of the route request frame counted from a source, and quality of a plurality of links included in the routes.

3. A communication control method executed by a communication device included in an ad hoc network in a reactive routing scheme, the communication control method comprising:
   receiving a route request frame including overall quality information on routes through which the route request frame has passed;
   selecting a route request frame to be transferred to another communication device based on the quality information, from the route request frames received through a plurality of routes; and
   transferring the selected route request frame to the another communication device, and discarding the route request frame when a quality value indicated by the quality information of the route request frame is smaller than a predetermined reference value, wherein
   the predetermined reference value is a value used for determining whether the communication device newly transfers the received route request frame to a neighboring communication device or discards the received route request frame at the communication device itself without transferring the received route request frame,
   the selecting includes selecting the route request frame to be transferred by broadcast to the neighboring communication device and a peripheral communication device, based on the quality information, and
   the transferring includes setting the predetermined reference value in the route request frame and transmitting the route request frame by broadcast.

\* \* \* \* \*